(12) United States Patent
Pabon et al.

(10) Patent No.: US 6,891,777 B2
(45) Date of Patent: May 10, 2005

(54) SUBSURFACE BOREHOLE EVALUATION AND DOWNHOLE TOOL POSITION DETERMINATION METHODS

(75) Inventors: Miguel F. Pabon, Sugar Land, TX (US); W. Robert Sloan, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 374 days.

(21) Appl. No.: 10/174,881

(22) Filed: Jun. 19, 2002

(65) Prior Publication Data

US 2003/0235114 A1 Dec. 25, 2003

(51) Int. Cl.$^7$ .............................. G01V 1/00; G01V 1/40
(52) U.S. Cl. ............................. 367/27; 367/29; 367/35; 367/127; 181/105
(58) Field of Search ............................. 367/27, 34, 35, 367/37, 38, 87, 127; 175/41; 181/105

(56) References Cited

U.S. PATENT DOCUMENTS

| | | | |
|---|---|---|---|
| 3,524,162 A | | 8/1970 | Zill |
| 4,665,511 A | | 5/1987 | Rodney et al. |
| 4,698,793 A | | 10/1987 | Wu |
| 4,964,085 A | | 10/1990 | Coope et al. |
| 5,058,078 A | | 10/1991 | Eyl et al. |
| 5,077,697 A | | 12/1991 | Chang |
| 5,130,950 A | | 7/1992 | Orban et al. |
| 5,354,956 A | * | 10/1994 | Orban et al. ................. 181/105 |
| 5,387,767 A | | 2/1995 | Aron et al. |
| RE34,975 E | | 6/1995 | Orban et al. |
| 5,469,736 A | | 11/1995 | Moake |
| 5,513,528 A | * | 5/1996 | Holenka et al. .......... 73/152.03 |
| 5,644,550 A | * | 7/1997 | Priest .......................... 367/35 |
| 5,852,587 A | | 12/1998 | Kostek et al. |
| 6,038,513 A | | 3/2000 | Varsamis et al. |
| 6,041,861 A | * | 3/2000 | Mandal et al. .......... 166/250.01 |
| 6,188,643 B1 | * | 2/2001 | Liang et al. .................... 367/29 |
| 6,366,531 B1 | | 4/2002 | Varsamis et al. |
| 6,584,837 B2 | * | 7/2003 | Kurkoski ................. 73/152.02 |
| 6,648,083 B2 | * | 11/2003 | Evans et al. ................... 175/41 |

FOREIGN PATENT DOCUMENTS

| | | |
|---|---|---|
| EP | 0663511 A2 | 7/1995 |
| EP | 0671547 A1 | 9/1995 |

OTHER PUBLICATIONS

JJ Orban, MS Dennison, BM Jorion & JC Mayes "New Ultrsonic Caliper for MWD Operations," *SPE/IADC 21947*, pp. 439–448, SPE/IADC Drilling Conference, Amsterdam (Mar. 11–14, 1991).

C Maeso & I Tribe "Hole Shape from Ultrsonic Calipers and Density While Drilling—A Tool for Drillers," *SPE 71395*, pp. 1–7, SPE Annual Technical Conf. and Exh., New Orleans (Sep. 30–Oct. 3, 2001).

* cited by examiner

*Primary Examiner*—Thomas H. Tarcza
*Assistant Examiner*—Scott Hughes
(74) *Attorney, Agent, or Firm*—Victor H. Segura; Brigitte L. Echols (57) ABSTRACT

Methods for processing ultrasonic signal data to evaluate subsurface properties and tool orientation. Acoustic signals are transmitted into a plurality of azimuthal borehole positions. Formation echo signal transit time distributions are then determined in a plurality of azimuthal sectors for the acoustic signals. Front face echo signal transit times are also measured and farther-mode and closer-mode transit times are determined for the distribution of formation echo signals. Farther and closer tool standoffs are determined for the azimuthal sectors and a borehole diameter is determined from a summation including standoffs in opposing sectors. The standoffs are also used to determine a preferential tool position.

19 Claims, 10 Drawing Sheets

SUBSURFACE BOREHOLE EVALUATION AND DOWNHOLE TOOL POSITION DETERMINATION METHODS

BACKGROUND OF THE INVENTION

1. Field of the Invention

The invention relates generally to the field of well logging. More specifically, the invention relates to techniques for processing ultrasonic signal data to evaluate subsurface properties and tool orientation.

2. Background Art

Ultrasonic tools or instruments or calipers are one of several types of measurement tools used, including while drilling, to measure the size of a borehole. An ultrasonic tool induces a transducer that emits an acoustic signal and then detects the echo signals that are reflected from the borehole wall. The time that it takes the acoustic signal to return to the tool is proportional to the distance that the signal traveled.

A "front face echo" results from reflection of part of the acoustic signal from an interface between an acoustic transducer or sensor external window (called the "front face" of the sensor) and a fluid in the borehole. The borehole fluid or "mud" is pumped through the drill string and used to lubricate the drill bit and to carry borehole cuttings or chips upwardly to the surface as known in the art. A "formation echo" is the reflection of the acoustic signal from the formation or borehole wall. Transit time is the time it takes the signal to travel from the front face of the sensor, to the borehole wall and back again. The transit time is proportional to the distance between the tool and the borehole wall. When used with the speed of the acoustic signal in the mud, the transit time can be used to calculate the distance between the ultrasonic tool and the borehole wall. This distance is called "standoff."

U.S. Pat. No. 4,665,511 describes an acoustic calipering apparatus for while-drilling operations. U.S. Pat. Nos. 5,852,587, 5,387,767, and Re. 34,975 (all assigned to the present assignee) describe various ultrasonic measurement apparatus and additional transducer configurations. J. J. Orban et al., *New Ultrasonic Caliper for MWD Operations*, SPE/IADC DRILLING CONFERENCE, paper 21947, Amsterdam, Mar. 11–14, 1991 also describes ultrasonic calipering techniques for while-drilling operations.

Figure 1:
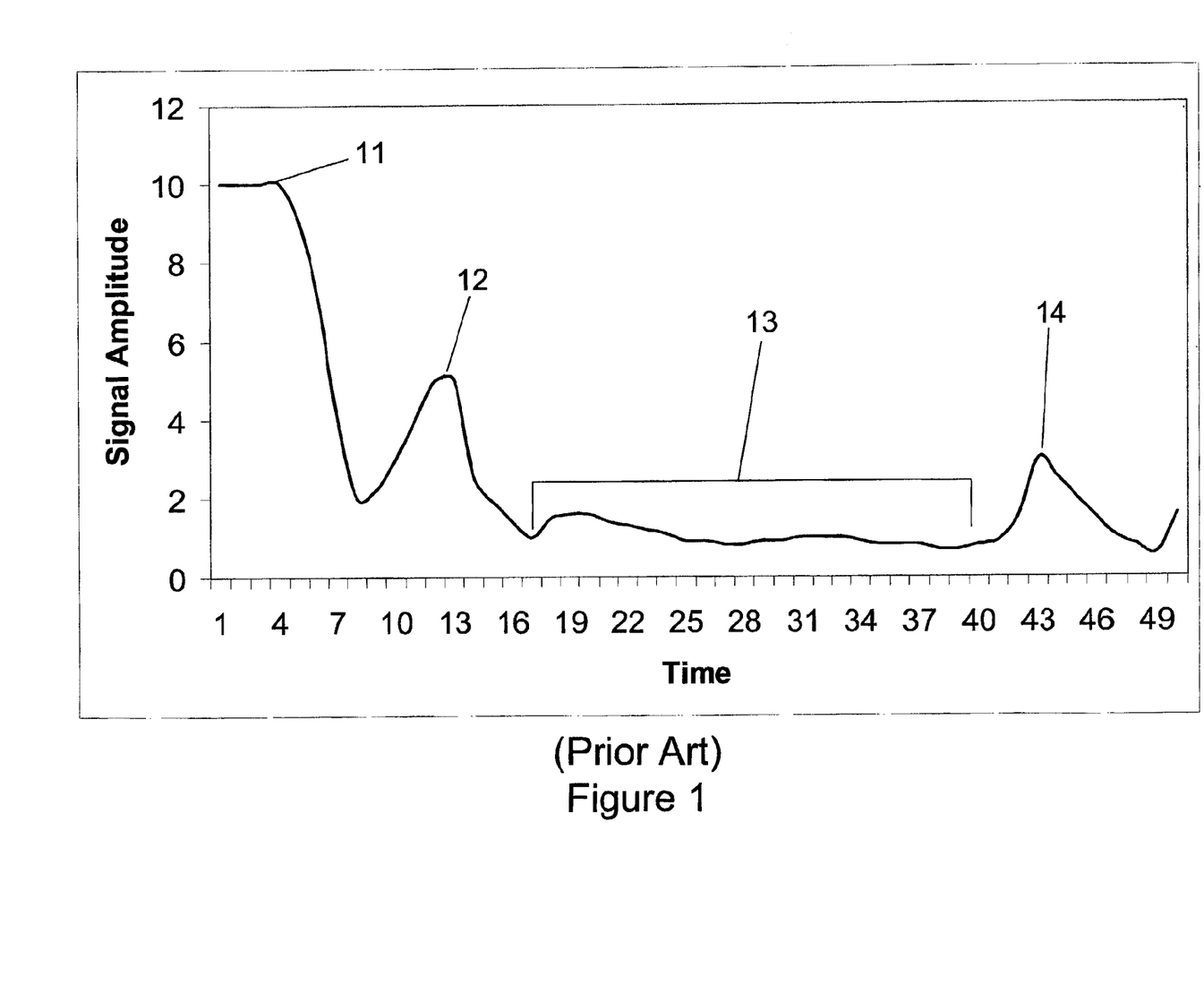
FIG. 1 is a graph of an echo signal (Prior Art).

FIG. 1 shows a graph of the signal amplitude acquired by an acoustic transducer after actuation or "firing." After the firing pulse, which occurs at time zero in FIG. 1, the sensor will detect ringing in the tool. Once the ringing is dampened, the transducer will detect the front face echo 12. Following the front face echo is the two-way transit time 13, during which the transducer detects substantially only noise. After the transit time 13, the transducer detects the formation echo 14.

Figure 2:
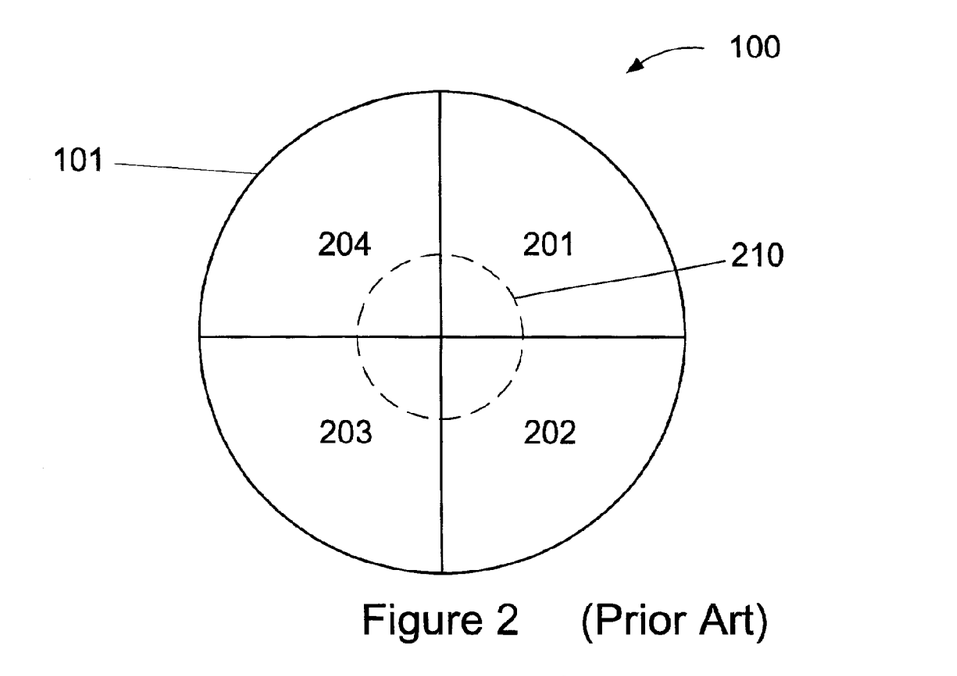
FIG. 2 is a chart showing the sectors of the azimuthal plane in a borehole (Prior Art).

Measurement practice known in the art includes dividing the azimuthal plane of the borehole into quadrants, each comprising about 90° of the azimuthal plane. FIG. 2 shows a diagram of the azimuthal plane 100 of a borehole 101 divided into four quadrants 201–204, or sectors. Each time the transducer fires, or for each signal acquisition, the tool 210 records the elapsed time and amplitude of the front face echo signal, the elapsed time and amplitude of the formation echo, and the quadrant 201–204 in which the tool 210 was oriented at the time of acquisition. The transit time, as previously explained, is the difference between the time at which the front face echo is detected and the time at which the formation echo is detected. At selected times, an on-board computer in the tool 210 may make a statistical evaluation of the transit time data collected by the tool 210. For each quadrant, a distribution of the frequency of particular transit times is generated.

Measurement practice known in the art also includes measuring the front face echo during a setup procedure. Before the tool is used to measure formation echo signals, it is operated and the front face echo is measured. The measurement of the front face echo transit time is assumed to be constant during actual use for that particular tool geometry. The detection of acoustic signals begins after the predetermined front face echo transit time.

Figure 3:
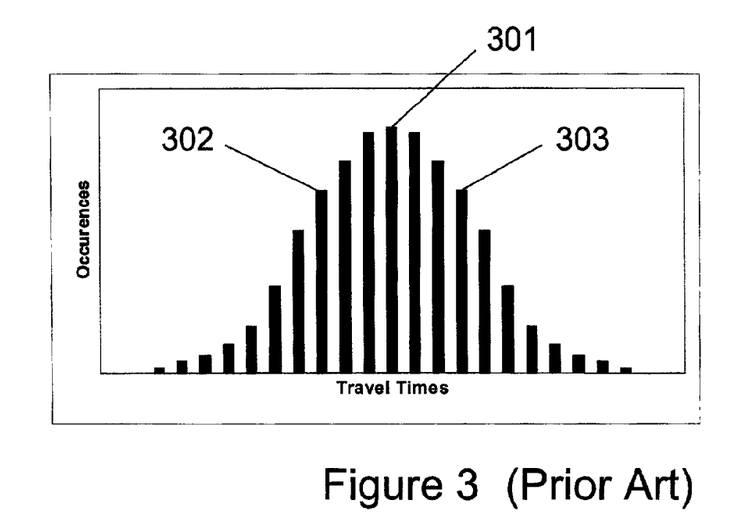
FIG. 3 is a histogram of formation transit times (Prior Art).

For each sector, three specific transit time values are computed in the statistical analysis. The first is the average transit time for the measurements in that sector. The average is the arithmetic mean of all transit times. The other two computed transit times are called the minimum and maximum transit times. These do not represent the longest and shortest times measured, but they are values that are statistically useful for evaluating the reliability of the measurements. FIG. 3 shows a histogram of transit times with the average 301, the minimum 302, and the maximum 303. The minimum transit time 302 is defined as the transit time value where 25% of the data values have transit times shorter than the minimum 302, and 75% of the data values have transit times longer than the minimum 302. Similarly, the maximum transit time 303 is defined so that only 25% of the data values are longer than the maximum 303 and 75% are shorter. The closer the average 301, minimum 302, and maximum 303 are to each other, the better the estimate of the borehole radius. If the maximum transit time 303 and the minimum transit time 302 for a particular quadrant vary by more than about 30%, the measurement is considered non-useful.

The average 301, maximum 303, and minimum 302 are converted to transit distances by multiplying by the speed of sound in the drilling fluid. The result represents the most likely standoff in the standoff range. Again, the closer the values are to each other, the more reliable the measurement.

Prior art detection methods include filtering noise out of the detected signal. Time is divided into separate periods, each with a respective amplitude threshold signal value. A signal is not used in calculating the histogram unless it is above the amplitude threshold value for the particular time period in which it is acquired. The amplitude threshold decreases in a stair-step manner.

Figure 4:
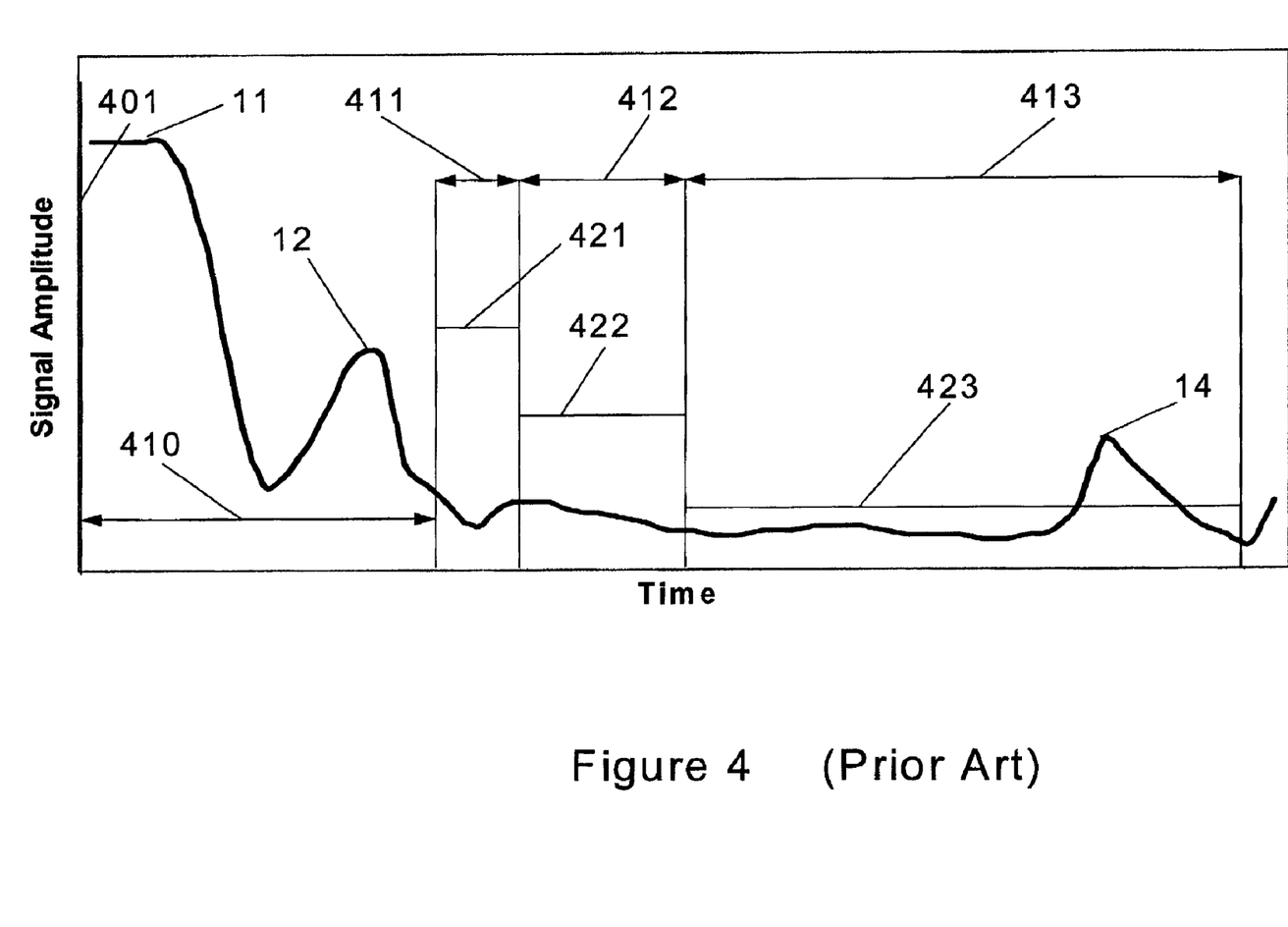
FIG. 4 shows a reverse-staircase threshold (Prior Art).

FIG. 4 shows an example of a conventional detection mode. There is a blanking time 410 between the time 401 the transducer fires and the first time interval 411. No signals are considered for the measurement during the blanking time. The front face echo 12 arrives during this time 410. The front face echo transit time is assumed to be the same as was measured during setup. During the first time interval 411, there is a first threshold 421. An echo signal that is received at the transducer during the first time interval 411 is considered valid if the amplitude of the signal exceeds the value of the first threshold 421. No such signals are shown in FIG. 4. Thus no signal would be detected. A second threshold 422 is applied to a second time interval 412. Any echo signal arriving at the transducer during the second time interval will not be considered valid unless its amplitude exceeds the second threshold 422. Again, FIG. 2 does not show any signal that exceeds the second threshold 422. Similarly, a third threshold 423 is used during a third time interval 413. The formation third threshold 423, thus, the formation echo would be detected. Ideally, the time periods are selected so that no echo signal would arrive after the end of the last time period, and the measurement sequence is completed. Another measurement sequence can then be commenced. Three time periods are shown in this example, but a different number of time periods can be selected to suit the needs of the measurement situation. The threshold values are determined by measuring the maximum possible contrast, i.e. PEEK/water, and using those signal values to calculate the optimum threshold. PEEK is a class of polyetherketones (see U.S. Pat. Nos. 4,320,224, 5,354,956), available from Victrex USA, Inc. of West Chester, Pa.

Prior art methods use multiple standoff measurements, but the differences, representing tool movement in the borehole, are averaged out in the calculation. Further, the threshold filtering method of the prior art can mask background noise, but it does not take into account the effect of different acoustic matching between the PEEK material and the borehole fluid.

Thus there remains a need for improved subsurface acoustic measurement techniques.

SUMMARY OF INVENTION

The invention provides a method for evaluating a borehole traversing a subsurface formation. The method comprises transmitting an acoustic signal into the borehole at each of a plurality of azimuthal positions; determining a transit time for a formation echo signal for each of the plurality of acoustic signals; and determining a distribution of formation echo signal transit times in each of a plurality of azimuthal sectors.

The invention provides a method for evaluating a borehole traversing a subsurface formation. The method comprises transmitting an acoustic signal into the borehole at each of a plurality of azimuthal positions; determining an amplitude and a transit time for a front face echo signal for each of the plurality of acoustic signals; selecting a threshold curve for each of the plurality of acoustic signals based on the amplitude of the front face echo, a power output of a transducer, a tool geometry, and an electronic offset of the tool; and determining a formation echo signal for each of the plurality of acoustic signals as a signal with an amplitude that exceeds the threshold curve.

The invention provides a method for evaluating a borehole traversing a subsurface formation. The method comprises selecting a plurality of azimuthal sectors in the borehole so that each of the plurality of azimuthal sector forms an opposing sector pair with an opposing sector; transmitting an acoustic signal into the borehole in each of the plurality of azimuthal sectors; determining an amplitude and a transit time for a front face echo for each acoustic signal; selecting a threshold curve for each acoustic signal based on the amplitude of the front face echo, a power output of a transducer, a tool geometry, and an electronic offset of the tool; determining a formation echo signal for each acoustic signal as a signal with an amplitude that exceeds the threshold curve; determining a transit time for the front face echo signal for each acoustic signal; determining a farther-mode transit time and a closer-mode transit time for a distribution of formation echo signal transit times in each of the plurality of azimuthal sectors; determining a farther standoff for each of the plurality of azimuthal sectors as a distance corresponding to the farther-mode transit time by using a speed of the acoustic signals in a borehole fluid; determining a closer standoff for each of the plurality of azimuthal sectors as a distance corresponding to the closer-mode transit time by using the speed of the acoustic signals in the borehole fluid; determining a distance differential in each of the plurality of azimuthal sectors as a difference between the farther standoff and the closer standoff; and calculating the sum of the closer standoffs of each sector in each opposing sector, a tool size, and an average of the distance differentials of each sector in each opposing sector pair.

The invention provides a method for evaluating a preferential position of a tool disposed in a borehole traversing a subsurface formation. The method comprises selecting a plurality of azimuthal sectors in the borehole so that each of the plurality of azimuthal sector forms an opposing sector pair with an opposing sector; transmitting an acoustic signal into the borehole in each of the plurality of azimuthal sectors; determining an amplitude and a transit time for a front face echo for each acoustic signal; selecting a threshold curve for each acoustic signal based on the amplitude of the front face echo, a power output of a transducer, a tool geometry, and an electronic offset of the tool; determining a formation echo signal for each acoustic signal as a signal with an amplitude that exceeds the threshold curve; determining a transit time for the front face echo signal for each acoustic signal; determining a farther-mode transit time and a closer-mode transit time for a distribution of formation echo signal transit times in each of the plurality of azimuthal sectors; determining a farther standoff for each of the plurality of azimuthal sectors as a distance corresponding to the farther-mode transit time by using a speed of the acoustic signals in a borehole fluid; determining a closer standoff for each of the plurality of azimuthal sectors as a distance corresponding to the closer-mode transit time by using the speed of the acoustic signals in the borehole fluid; in each of the plurality of sectors, determining if either or both of the farther standoff and the closer standoff is a preferential position of the tool; and determining radial movements of the tool in the borehole from the preferential positions of the plurality of azimuthal sectors.

BRIEF DESCRIPTION OF DRAWINGS

Other aspects and advantages of the invention will become apparent upon reading the following detailed description and upon reference to the drawings in which.

DETAILED DESCRIPTION

The method according to the invention enables measuring the shape of a borehole.

It also enables determining the tool's preferential position in the borehole, allowing for better interpretation of other well logging data.

Figure 5:
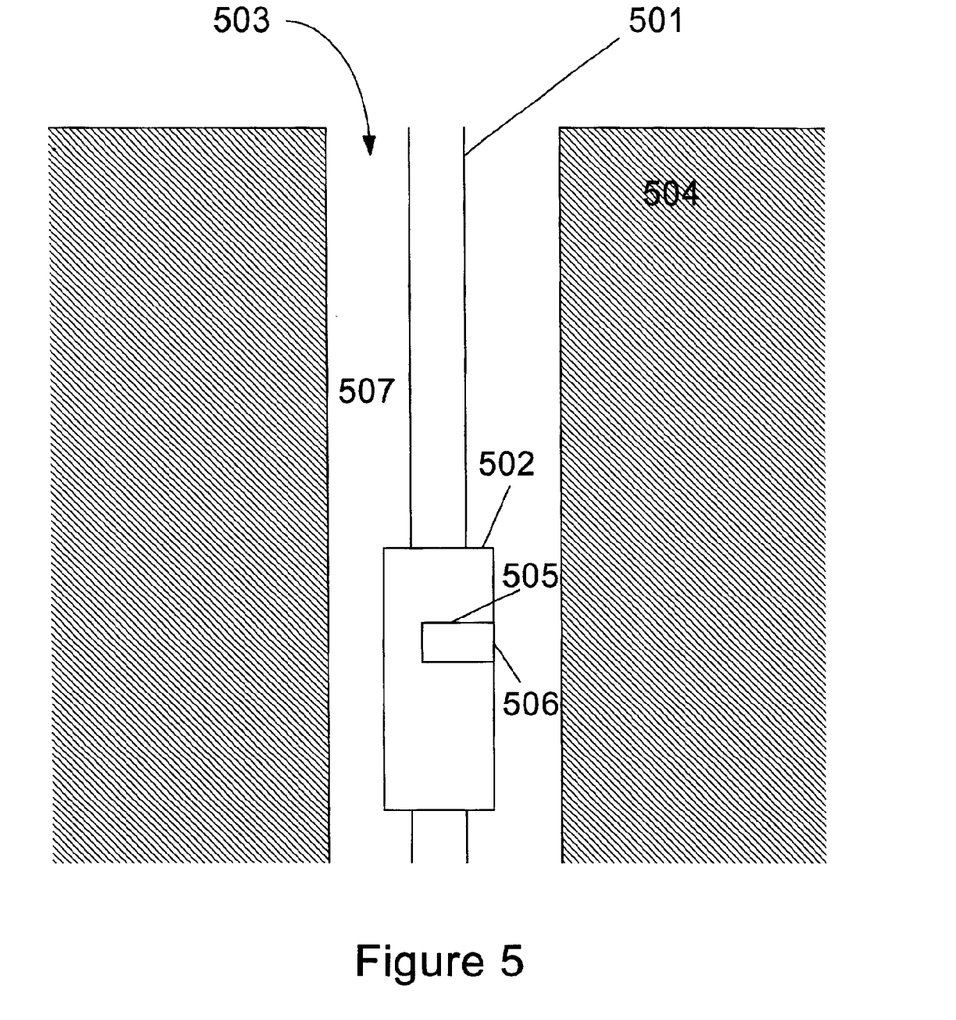
FIG. 5 is a schematic diagram of an acoustic type well-logging tool in a borehole.

FIG. 5 shows a drill string 501 with a well logging tool 502, such as an ultrasonic tool, disposed in a borehole 503 through an earth formation 504. The tool 502 can be any conventional logging instrument used to make acoustic measurement, as shown, for example in U.S. Pat. Nos. 5,354,956, 5,852,587, and 5,387,767. Alternatively, the tool 502 can also be any known instrument of the lowered into the borehole 503 via a wireline or coiled tubing for borehole evaluation (not shown). The tool 502 houses a transducer 505 of the type shown, for example, in U.S. Pat. No. 5,354,956 (assigned to the present assignee). The transducer 505 window 506 is exposed to the mud 507 within the borehole 503.

Figure 6:
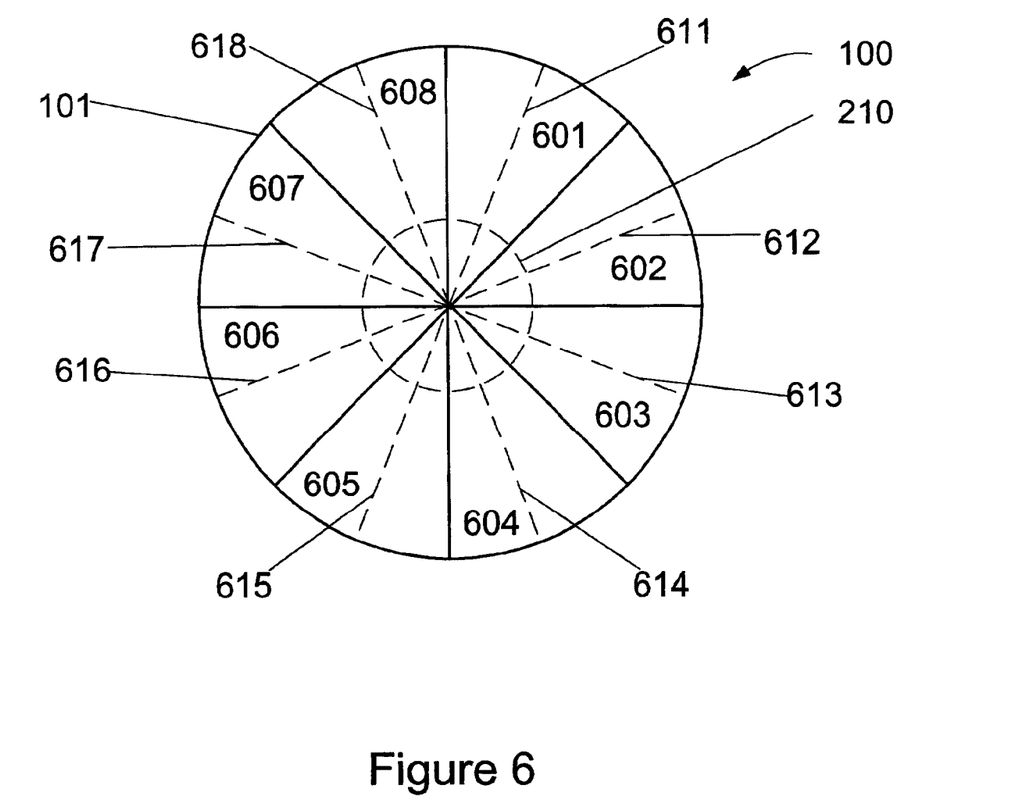
FIG. 6 is a chart showing the azimuthal plane of the borehole divided into multiple sectors in accord with the invention.

FIG. 6 shows the azimuthal plane 100 of the borehole 101 divided into eight separate sectors 601–608. Each sector 601–608 has a radius, 611–618 respectively, that extends from the center of the tool 210 to the borehole wall 101. The radius for each sector 611–618 is computed by adding one-half of the tool 210 diameter to the transit distance determined for each sector 601–608.

Each sector 601–608 has an opposing sector located about 180° around the azimuthal plane 100. In the example of FIG. 6, sector 601 has opposing sector 605. Similarly, sector 602 has opposing sector 606, sector 603 has sector 604 has opposing sector 608. The radius 611–614 of each sector 601–604 can be combined with the radius 615–618 of the opposing sector 605–608 to create a diameter, or diameters, of the borehole. Thus, in FIG. 6, radius 611 of sector 601 can be combined with radius 615 of sector 605 to determine a diameter of the borehole 101 for the two opposing sectors. FIG. 6 shows four such diameters, the 611–615 diameter, the 612–616 diameter, the 613–617 diameter, and the 614–618 diameter.

This invention is not intended to be limited to eight sectors with four diameters. As a practical matter, there should be enough sectors to perform the statistical calculations. Otherwise, any number of sectors is acceptable so that the method provides a borehole shape that meets the desired needs. Preferably, an even number of sectors is used, so that each sector has an opposing sector for computing a diameter. For example, the azimuthal plane could be divided into 16 sectors, to determine 16 radii and eight diameters. The number of sectors can be selected to meet the needs of a particular drilling or measurement situation.

In one embodiment, the operation of the transducer in the tool is synchronized with the rotation of the tool or drillstring. By synchronizing the operation of the transducer, it will emit an acoustic burst every time the tool rotates into a new sector. A burst consists of one or more acoustic pulses. Thus, as the tool rotates, it will emit a new set of acoustic signals into every sector. By using a rapid burst, lasting 5 milliseconds, for example, the tool can be considered not to have moved during the firing interval, even for rotational speeds as high as 250 RPM. Advantageously, this allows for a substantially equal number of measurements in each sector and ensures that for each measurement in a particular sector, a corresponding measurement will be made in the opposing sector during the rotation of the tool.

For each transmitted acoustic signal, the tool will measure the time after firing of detection of any signal with an amplitude that exceeds the threshold value, and the sensor will record the sector in which the measurement was made. If the threshold is properly selected, the only acoustic signals with an amplitude that exceeds the threshold will be the front face echo and the formation echo. As will be explained below, in some embodiments, the amplitude of the front face echo is preferably measured after each firing.

In one embodiment, the acoustic burst data may be sent to the surface by while-drilling telemetry as known in the art. Once received at the surface, the data can be recorded, processed, or computed in accord with the techniques of the invention. Alternatively, some or all of the processing can be performed downhole and the data can be recorded uphole, downhole, or both using electronics housed in the tool 502 as known in the art. In another embodiment, the data is conveyed to the surface in real time via an electric cable attached to the wireline tool (not shown) as known in the art. It will be understood that alternative means can be employed for communicating the acquired data to the surface as the precise form of communication is immaterial to the implementation of the invention.

It will also be apparent to those skilled in the art that the invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

The detection mode according to one aspect of the present invention compares the acoustic signal received at the tool that follows a firing of the tool with a threshold that is in the form of a curve. When the amplitude of the received signal is greater than the threshold curve, the signal is acknowledged. The threshold curve is given by the expression:

$$TDC = (A \times e^{-B(t-C)}) + D \tag{1}$$

where A is the amplitude of the front face echo, B is a function of the transducer power output (fixed at manufacturing), C is a function of the sensor's window geometry (fixed during the run), D is the electronic offset at zero signal (fixed at manufacturing), and t is the time since firing.

The amplitude of the front face echo, A in Equation 1, can be obtained several ways. First, the amplitude could be measured during the tool setup and assumed to be constant during actual use. Because the power output of the transducer in the tool varies with each firing, and the acoustic impedance contrast at the interface of the tool and the drilling fluid affects the front face echo amplitude, the actual amplitude of the front face echo can vary with each firing. In some embodiments, the amplitude of the front face echo is measured in-situ. This means measuring the front face echo in the borehole substantially every time the tool is fired. Advantageously, repeatedly measuring the front face echo amplitude to calculate the threshold curve accounts for these factors with each firing.

Figure 7:
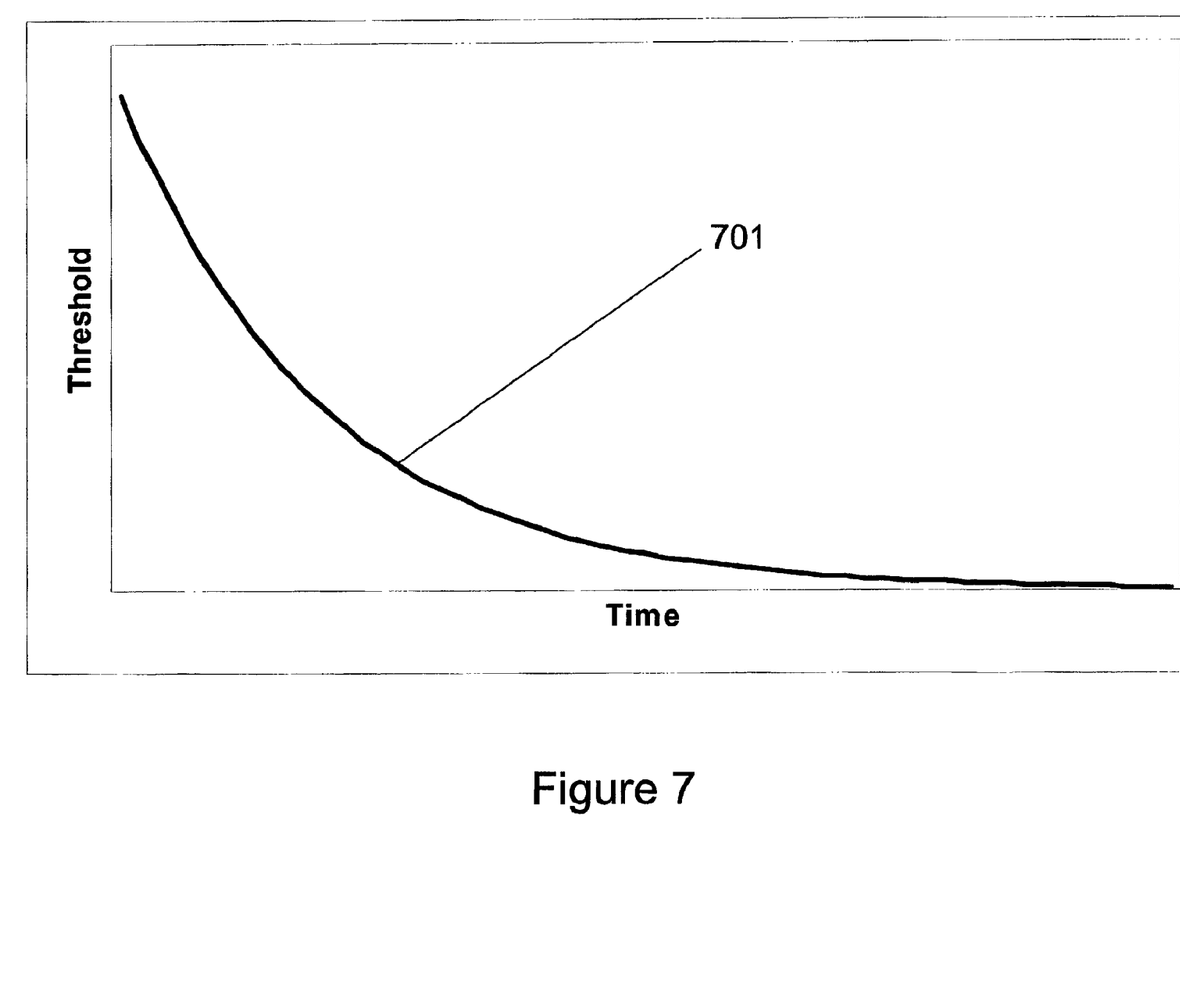
FIG. 7 is a graph of one embodiment of the threshold curve according to the invention.

FIG. 7 shows a threshold curve 701 according to the invention. Advantageously, the curve 701 is substantially smooth and does not include step changes in threshold values, as in the prior art. The threshold curve 701 of the present invention reduces the risk excluding otherwise valid echo signals that occur just prior to a step change in the threshold. It may also reduce the risk of including otherwise invalid signals that occur just after a step change in the threshold. Further, the threshold curve 701 of the present invention is calibrated for the amplitude of the front face echo, the sensor power output, the window geometry, and the electronic offset of each tool. By calibrating the curve 701 for these factors, it provides an improved basis for filtering noise, while also accounting for the acoustic matching between the mud and the material at the sensor's front face.

The tool's on-board computer (not shown) may accumulate data over a large time interval, for example 60 seconds. Based on the distribution of transit times from within the data accumulation interval, modes of the tool position are calculated for each sector. If the tool does not move with respect to the radius of a particular sector, the data for that sector will indicate a uni-modal distribution. In sectors where the tool does move with respect to the radius, at least a bi-modal distribution is identified. For a bi-modal distribution, the mode at the shorter transit time is called the closer-mode transit time, and the mode at the longer transit time is called the farther-mode transit time. There will be one farther-mode transit time and one closer-mode transit time for each sector. For a sector with a uni-modal distribution, the farther and closer-mode transit times will occur at the same transit time.

A time differential for each sector is calculated as the difference between the farther and closer-mode transit times for that sector. Thus:

$$\Delta t_X = FM_X - CM_X \tag{2}$$

where $\Delta t_X$ is the differential for sector X, $FM_X$ is the farther-mode transit time for sector X, and $CM_X$ is the closer-mode transit time for sector X. Again, for a sector with a uni-modal distribution, the differential will be zero ($\Delta t=0$).

Figure 8A:
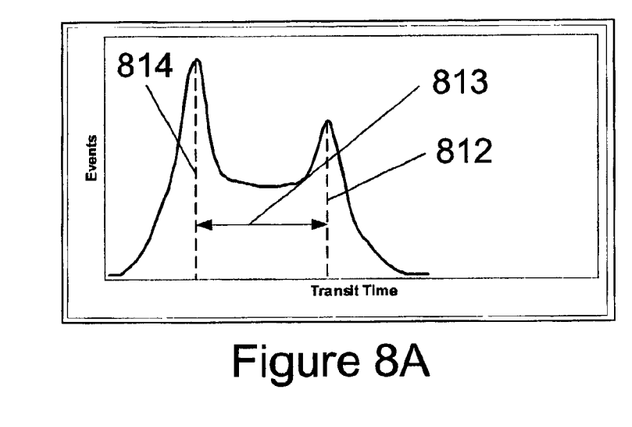
FIG. 8A shows a bi-modal formation transit time distribution with a preferential tool position.
Figure 8B:
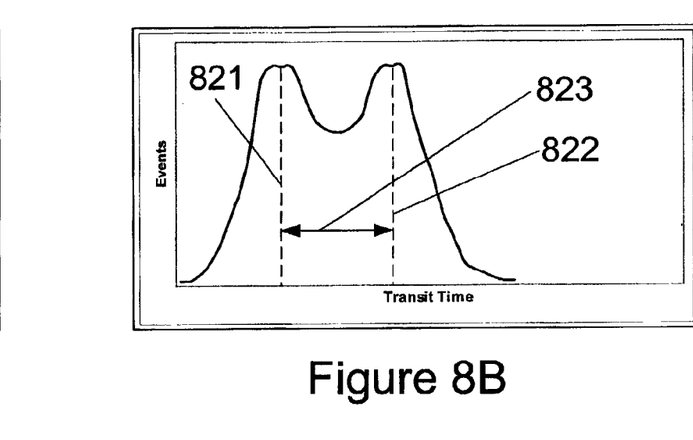
FIG. 8B shows a bi-modal transit time distribution with no preferential tool position.

FIGS. 8A–8D show histograms and time differentials for four different cases. In FIG. 8A, there are two different peaks 812, 814 in the histogram, each representing one of the modes. Because the histogram shows a bi-modal distribution, the tool oscillated during the accumulation interval between the preferential positions corresponding to the farther-mode transit time and the closer-mode transit time. FIG. 8A shows that the frequency of occurrence of travel times at the closer mode is larger than frequency of occurrence of travel times at the farther mode, thus, the tool was predominantly located at the position corresponding to closer-mode transit time, with respect to the borehole wall. FIG. 8B is similar to FIG. 8A, but in FIG. 8B neither the farther mode nor the closer mode is larger than the other.

This indicates that the tool oscillated equally between the positions corresponding to the farther and closer-mode transit times.

Figure 8C:
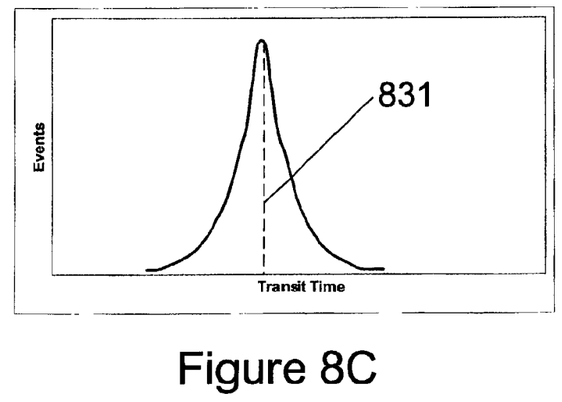
FIG. 8C shows a uni-modal formation transit time distribution.
Figure 8D:
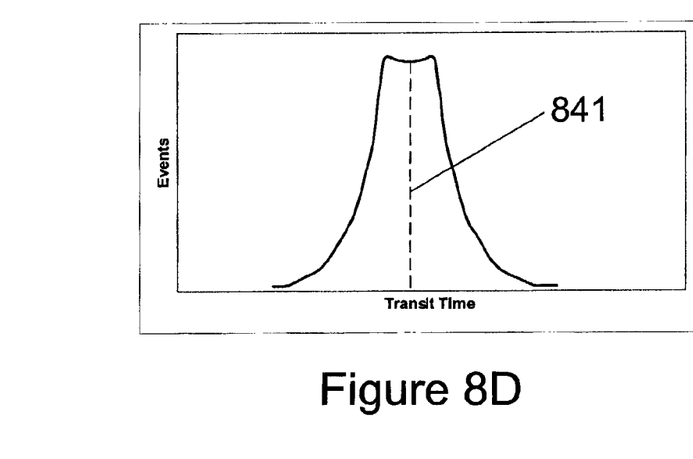
FIG. 8D shows a uni-modal formation transit time distribution.

FIGS. 8C and 8D show examples of data histograms with uni-modal distributions, 831, and 841 respectively. In each case, the farther mode and the closer mode occur at the same transit time. From such distributions it can be inferred that the tool did not move substantially in a lateral direction of the sector in which the measurements were made.

The farther and closer-mode transit times can be used to calculate a farther and a closer standoff, respectively. The result of multiplying the transit times by the speed of the acoustic signal in the borehole fluid is standoff distance. This calculation can be made for both the farther and closer-mode transit times. Similarly, the speed of the acoustic signal can be used to convert the time differential to a distance differential, representing the distance between the tool's preferential positions at the farther and closer standoffs.

The techniques of the invention include computing the diameter of the borehole. The farther standoff and the closer standoff for sector 1 are respectively shown at 911 and 912 in FIG. 9. The farther standoff 911 represents preferential position 902 with the largest standoff with respect to sector 1, and the closer standoff 912 represents the preferential position 901 with the smallest standoff with respect to sector 1. Conversely, the farther standoff 951 represents preferential position 901 with the largest standoff with respect to sector 5, and the closer standoff 952 represents the preferential position 902 with the smallest standoff with respect to sector 5. Note, that opposing sector may not have symmetrical preferential positions, although this example shows that.

Figure 9:
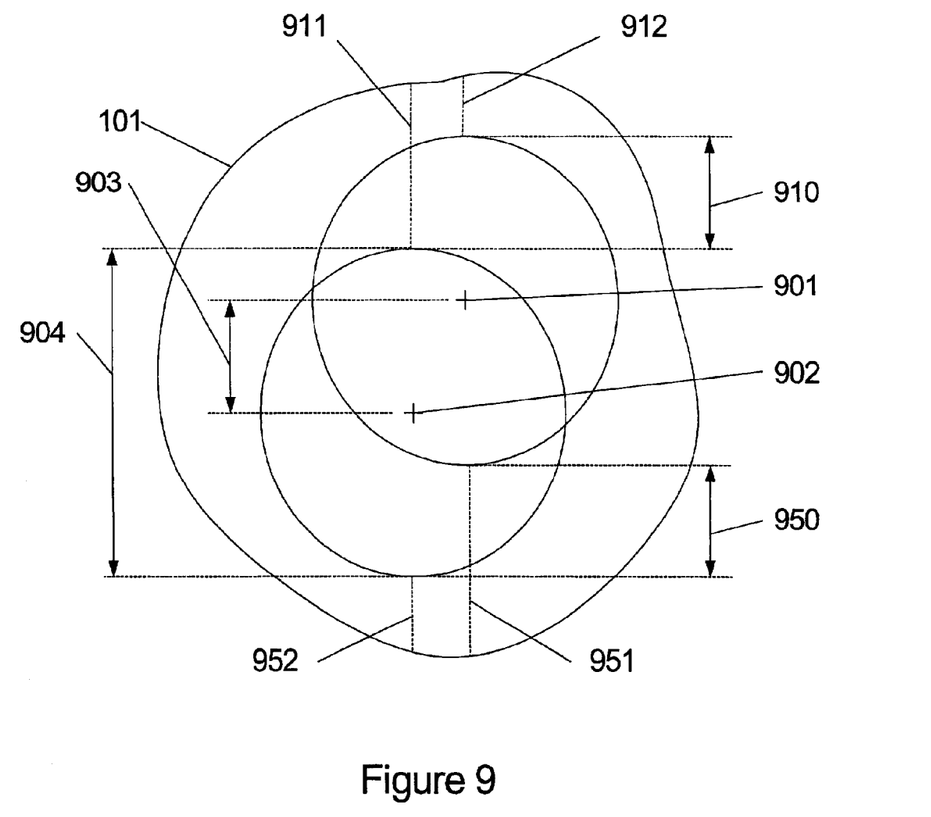
FIG. 9 is a diagram of two preferential tool positions in a borehole.

The borehole diameter can be calculated for each pair of opposing sectors. The diameter is equal to the sum of the closer standoff from one sector, for example 912, the closer standoff from the opposing sector for example 952, the tool size 904, and the average of the distance differentials 903 from both sectors. The distance differential for a particular sector is the distance between the farther and closer standoffs for that sector (910, 950). In FIG. 9, that is shown at element 903. Because the opposing sectors in FIG. 9 have the same two preferential positions, they also have the same distance differential 903. Those skilled in the art will realize that opposing sectors will not necessarily have the same preferential positions, thus, the distance differentials are averaged for an accurate measurement of the borehole diameter.

The borehole diameter can be calculated using the following expression:

$$D_{1,5} = CS_1 + CS_5 + Toolsize + \frac{\Delta d_1 + \Delta d_5}{2} \tag{3}$$

where $D_{1,5}$ is the diameter across sectors 1 and 5, $CS_1$ is the closer standoff for sector 1, $CS_5$ is the closer standoff of sector 5, $\Delta d_1$ is the distance differential of sector 1, and $\Delta d_5$ is the distance differential of sector 5. In essence, the borehole evaluation techniques of the invention entail an analysis of the anti-correlation effects encountered with the tool within the borehole. The histograms are processed as described herein in terms of farther and closer standoffs in an azimuthal sweep around the borehole.

Advantageously, embodiments of the invention can be used to determine the actual size of the borehole and the differential of each sector. Where the prior art methods averaged all of the travel times for each sector, a technique of the invention computes a differential for each sector. This allows the evaluation of the tool's preferential positions inside the borehole. The histogram plot for transit times per sector is analyzed during a given time interval. Such a plot results in FIG. 8C (or 8D) if the distribution indicates no movement (or very small movement) along the axis in that sector. The analysis could also indicate movement in one sector between two positions with no preferred position (as in FIG. 8B). Alternatively, the analysis may indicate movement in one sector between two positions with one position being preferred (as in FIG. 8A, where the tool stays more frequently in the closer-standoff position).

Figure 10A:
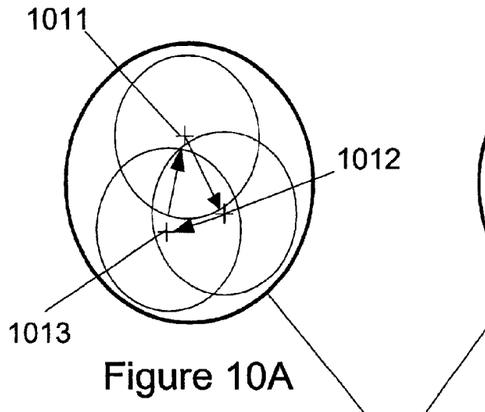
FIG. 10A shows a tool movement plot with three preferential tool positions.

Embodiments of the invention use time distributions and the modes for each sector to find the preferential position of the tool in the borehole. FIGS. 10A–10D show four examples of preferential positions of the tool in the borehole 101. In each case, the preferential position of the tool is plotted on a diagram of the borehole circumference 101. All of the preferential positions are superimposed onto each other, showing the movement of the tool in the borehole 101 as the tool rotates. FIG. 10A shows a plot of a tool that has three preferential positions 1011, 1012, and 1113 in the borehole. As the tool rotates within the borehole, the tool moves from the first preferential position 1011, to the second preferential position 1012, to the third preferential position 1013, and finally back to the first preferential position 1011, as indicated by the arrows.

Figure 10B:
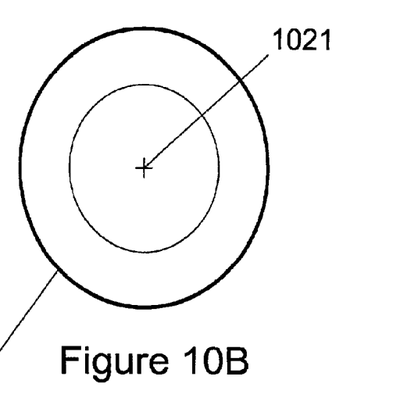
FIG. 10B shows a tool movement plot with no tool movement.
Figure 10C:
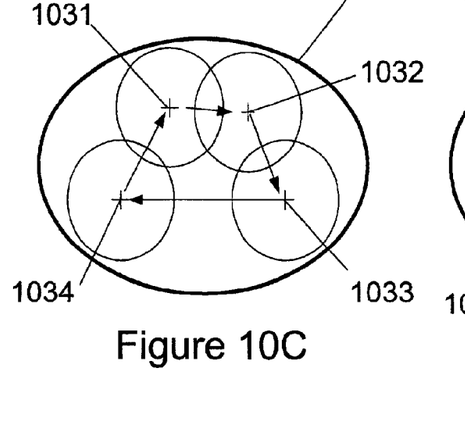
FIG. 10C shows a tool movement plot with four preferential positions that indicates a shock condition.
Figure 10D:
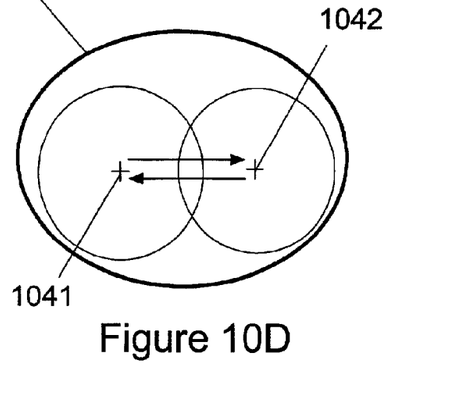
FIG. 10D shows a tool movement plot with two preferential tool positions.

FIG. 10B shows a plot where the tool 1021 axis does not move with respect to the borehole 101. Advantageously, the invention allows for improved interpretation of other well logs. For example, a preferential position plot as FIG. 10B indicates that the tool 1021 never touches the borehole wall 101. This condition would explain bad density log values, which are improved when the logging tool 1021 contacts the borehole wall 101.m FIG. 10C shows an oval borehole 101 with four preferential positions 1031, 1032, 1033, and 1034. The tool rattles inside the borehole, and it can be deduced that the tool is under shock conditions. A plot as in FIG. 10C would alert a driller to a potentially dangerous or damaging situation. FIG. 10D shows the tool in an oval borehole 101. The tool oscillates between the first preferential position 1041 and the second preferential position 1042, in a pendulum mode.

Figure 11:
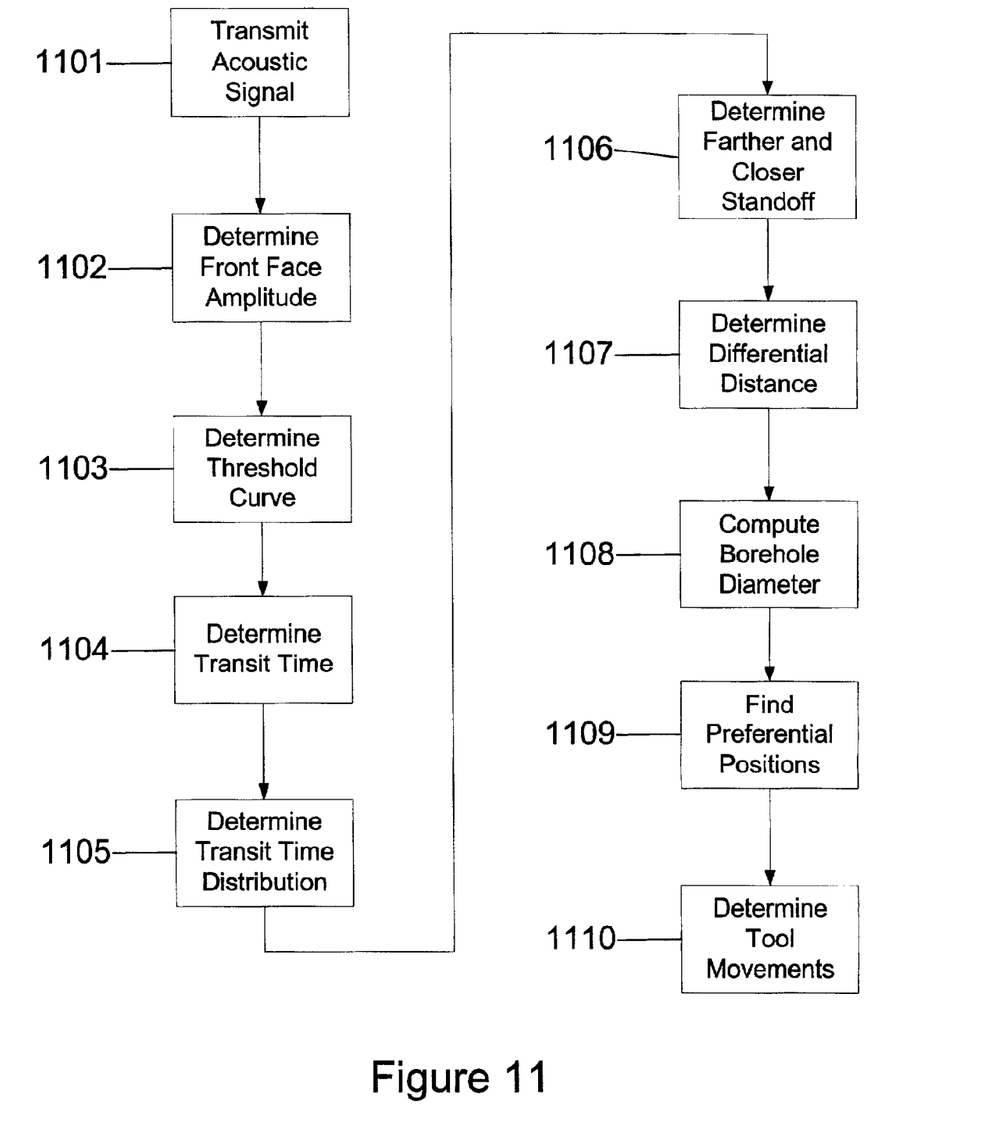
FIG. 11 is a flow chart showing an embodiment according to the invention.

A method according to the invention is shown in FIG. 11. The method includes transmitting an acoustic signal into a borehole at a plurality of azimuthal positions 1101, and determining a transit time for a formation echo signal for each of the acoustic signals 1104. In some embodiment, the method includes determining the amplitudes of a front face echo signal 1102 and then determining a threshold curve 1103 based on the amplitude of the front face echo, a transducer power output, a sensor window geometry, and the electronic offset at zero signal.

In some embodiments, the method next includes determining a distribution of formation echo signals 1105 in each of the azimuthal sectors and determining a farther-mode transit time and a closer-mode transit time 1106 if the distribution is bi-modal. In another embodiment, the method includes determining a farther and closer standoff for each sector 1106 that correspond to the farther-mode transit time and the closer-mode transit time for that sector, and determining a differential distance in each sector 1107 that is the difference between the farther and closer standoff for that sector.

In one embodiment, the method includes determining a borehole diameter by adding the closer standoff from one sector, the closer standoff from the opposing sector, the tool size, and the average of the distance differentials from the sector and the opposing sector 1108. In another embodiment, the method includes determining if either or both of the farther and closer standoffs represent a preferred position of the tool 1109 and determining the radial movements of the tool in the borehole by plotting the preferential positions 1110.

For the purposes of this specification it will be clearly understood that the word "comprising" means "including but not limited to", and that the word "comprises" has a corresponding meaning.

While the invention has been described with respect to a limited number of embodiments, those skilled in the art, having benefit of this disclosure, will appreciate that other embodiments can be devised which do not depart from the scope of the invention as disclosed herein. For example, although embodiments of the invention have been disclosed focusing on while-drilling applications, the invention is clearly applicable to all types of subsurface operations involving acoustic measurements. Accordingly, the scope of the invention should be limited only by the attached claims.

What is claimed is:

1. A method for evaluating a borehole traversing a subsurface formation, comprising:

transmitting an acoustic signal into the borehole at each of a plurality of azimuthal positions;

determining a transit time for a front face echo signal for the plurality of acoustic signals;

determining a transit time for a formation echo signal for each of the plurality of acoustic signals;

selecting a threshold curve for each of the plurality of acoustic signals based on an amplitude of the front face echo signal, a power output of a transducer, a tool geometry, and an offset of said tool;

determining the formation echo signal for each of the plurality of acoustic signals as a signal with an amplitude that exceeds the threshold curve;

measuring an elapsed time between the transmission of the acoustic signal and a recording of the formation echo signal for each of the plurality of acoustic signals;

determining a distribution of formation echo signal transit times in each of a plurality of azimuthal sectors;

determining a farther standoff for each of the plurality of azimuthal sectors as the standoff distance corresponding to a farther-mode transit time by using a speed of the acoustic signal in a borehole fluid;

determining a closer standoff for each of the plurality of azimuthal sectors as a standoff distance corresponding to a closer-mode transit time by using the speed on the acoustic signal in the borehole fluid; and in each of the plurality of sectors, determining if either or both of the farther standoff and the closer standoff is a preferential position of said tool.

2. The method of claim 1, wherein the plurality of azimuthal sectors are determined by dividing an azimuthal plane so that each of the plurality of azimuthal sectors forms an opposing sector pair with an opposing sector.

3. The method of claim 2, further comprising:

determining a distance differential in each of the plurality of azimuthal sectors as the difference between the farther standoff and the closer standoff in each of the plurality of azimuthal sectors;

calculating a diameter of the borehole as a sum of the closer standoffs of both sectors in one opposing sector pair, a tool size, and an average of the distance differentials from each sector in the opposing sector pair.

4. The method of claim 1, further comprising determining radial movements of the tool in the borehole from the preferential positions of the plurality of azimuthal sectors.

5. The method of claim 4, wherein determining the radial movements comprises plotting the preferential positions for each of the plurality of sectors on a borehole diagram.

6. A method for evaluating a borehole traversing a subsurface formation, comprising:

transmitting an acoustic signal into the borehole at each of a plurality of azimuthal positions;

determining an amplitude and a transit time for a front face echo signal for each of the plurality of acoustic signals;

selecting a threshold curve for each of the plurality of acoustic signals based on the amplitude of the front face echo, a power output of a transducer, a tool geometry, and an electronic offset of the tool;

determining a formation echo signal for each of the plurality of acoustic signals as a signal with an amplitude that exceeds the threshold curve;

determining a farther-mode transit time and a closer-mode transit time for a distribution of formation echo signal transit times in each of a plurality of azimuthal sectors;

determining a farther standoff for each of the plurality of azimuthal sectors as the standoff distance corresponding to the farther-mode transit time by using a speed of the acoustic signal in a borehole fluid.

determining a closer standoff for each of the plurality of azimuthal sectors as a standoff distance corresponding to the closer-mode transit time by using the speed on the acoustic signal in the borehole fluid; and in each of the plurality of sectors, determining if either or both of the farther standoff and the closer standoff is a preferential position of the tool.

7. The method of claim 6, farther comprising estimating a diameter of the borehole as a sum of a tool size and the standoffs in opposing sectors.

8. The method of claim 6, wherein the plurality of azimuthal sectors are determined by dividing an azimuthal plane so that each of the plurality of azimuthal sectors forms an opposing sector pair with an opposing sector.

9. The method of claim 8, further comprising:

determining a distance differential in each of the plurality of azimuthal sectors as the difference between the farther standoff and the closer standoff in each of the plurality of azimuthal sectors;

calculating a diameter of the borehole as a sum of the closer standoffs of both sectors in one opposing sector pair, a tool size, and an average of the distance differentials from each sector in the opposing sector pair.

10. The method of claim 6, further comprising determining radial movements of the tool in the borehole from the preferential positions of the plurality of azimuthal sectors.

11. The method of claims 10, wherein determining the radial movements comprises plotting the preferential positions for each of the plurality of sectors on a borehole diagram.

12. A method for evaluating a borehole traversing a subsurface formation, comprising:

selecting a plurality of azimuthal sectors in the borehole so that each of the plurality of azimuthal sector forms an opposing sector pair with an opposing sector;

transmitting an acoustic signal into the borehole in each of the plurality of azimuthal sectors;

determining an amplitude and a transit time for a front face echo for each acoustic signal;

selecting a threshold curve for each acoustic signal based on the amplitude of the front face echo, a power output of a transducer, a tool geometry, and an electronic offset of the tool;

determining a formation echo signal for each acoustic signal as a signal with an amplitude that exceeds the threshold curve;

determining a transit time for the front face echo signal for each acoustic signal;

determining a farther-mode transit time and a closer-mode transit time for a distribution of formation echo signal transit times in each of the plurality of azimuthal sectors;

determining a farther standoff for each of the plurality of azimuthal sectors as a distance corresponding to the farther-mode transit time by using a speed of the acoustic signals in a borehole fluid;

determining a closer standoff for each of the plurality of azimuthal sectors as a distance corresponding to the closer-mode transit time by using the speed of the acoustic signals in the borehole fluid;

determining a distance differential in each of the plurality of azimuthal sectors as a difference between the farther standoff and the closer standoff; and calculating the sum of the closer standoff of each sector in each opposing sector, a tool size, and an average of the distance differentials of each sector in each opposing sector pair.

13. The method of claim 12, wherein a diameter of the borehole is determined from the calculated sum of the sector standoffs, tool size, and distance differentials average.

14. The method of claim 12, wherein dividing the azimuthal plane comprises dividing the azimuthal plane into eight equal sectors with four opposing sector pairs.

15. The method of claim 12, wherein dividing the azimuthal plane comprises dividing the azimuthal plane into sixteen equal sectors with eight opposing sector pairs.

16. A method for evaluating a preferential position of a tool disposed in a borehole traversing a subsurface formation, comprising:

selecting a plurality of azimuthal sectors in the borehole so that each of the plurality of azimuthal sector forms an opposing sector pair with an opposing sector;

transmitting an acoustic signal into the borehole in each of the plurality of azimuthal sectors;

determining an amplitude and a transit time for a front face echo for each acoustic signal;

selecting a threshold curve for each acoustic signal based on the amplitude of the front face echo, a power output of a transducer, a tool geometry, and an electronic offset of the tool;

determining a formation echo signal for each acoustic signal as a signal with an amplitude that exceeds the threshold curve;

determining a transit time for the front face echo signal for each acoustic signal;

determining a farther-mode transit time and a closer-mode transit time for a distribution of formation echo signal transit times in each of the plurality of azimuthal sectors;

determining a farther standoff for each of the plurality of azimuthal sectors as a distance corresponding to the farther-mode transit time by using a speed of the acoustic signals in a borehole fluid;

determining a closer standoff for each of the plurality of azimuthal sectors as a distance corresponding to the closer-mode transit time by using the speed of the acoustic signals in the borehole fluid;

in each of the plurality of sectors, determining if either or both of the farther standoff and the closer standoff is a preferential position of the tool; and determining radial movements of the tool in the borehole from the preferential positions of the plurality of azimuthal sectors.

17. The method of claim 16, wherein determining the radial movements comprises plotting the preferential positions for each of the plurality of sectors on a borehole diagram.

18. The method of claim 16, wherein dividing the azimuthal plane comprises dividing the azimuthal plane into eight equal sectors with four opposing sector pairs.

19. The method of claim 16, wherein dividing the azimuthal plane comprises dividing the azimuthal plane into sixteen equal sectors with eight opposing sector pairs.

* * * * *